United States Patent

Koerner et al.

[11] Patent Number: 6,148,892
[45] Date of Patent: Nov. 21, 2000

[54] TIRE INFLATION APPARATUS AND METHOD HAVING FLOATING PLATEN

[75] Inventors: Arthur Koerner, Rochester; Paul G. Doan, Warren, both of Mich.

[73] Assignee: Fori Automation, Inc., Shelby Township, Mich.

[21] Appl. No.: 09/242,949

[22] PCT Filed: Feb. 11, 1998

[86] PCT No.: PCT/US98/02457

§ 371 Date: Feb. 25, 1999

§ 102(e) Date: Feb. 25, 1999

[87] PCT Pub. No.: WO98/34802

PCT Pub. Date: Aug. 13, 1998

Related U.S. Application Data

[60] Provisional application No. 60/037,554, Feb. 11, 1997.

[51] Int. Cl.[7] .................................................. B60C 25/05
[52] U.S. Cl. ................................. 157/1.1; 157/1
[58] Field of Search ................................ 157/1, 1.1, 1.17; 137/223

[56] References Cited

U.S. PATENT DOCUMENTS

| | | |
|---|---|---|
| 2,900,015 | 8/1959 | Harrison . |
| 3,461,938 | 8/1969 | Mueller . |
| 3,797,889 | 3/1974 | Wilkinson . |
| 3,978,903 | 9/1976 | Mueller et al. . |
| 4,004,693 | 1/1977 | Tsuji et al. . |
| 4,113,083 | 9/1978 | Friese et al. . |
| 4,179,106 | 12/1979 | Bergman . |
| 4,183,392 | 1/1980 | Kane . |
| 4,451,963 | 6/1984 | Karr et al. . |
| 4,618,303 | 10/1986 | Irie . |
| 4,714,505 | 12/1987 | Goodfellow et al. . |
| 4,746,258 | 5/1988 | Loomer et al. . |
| 4,840,697 | 6/1989 | Goodfellow et al. . |
| 4,846,334 | 7/1989 | Cargould . |
| 4,947,919 | 8/1990 | Timlin ................................. 157/1.1 X |
| 5,035,274 | 7/1991 | Kinnick et al. ......................... 157/1.1 |
| 5,072,765 | 12/1991 | Kane et al. ............................. 157/1.1 |
| 5,094,284 | 3/1992 | Curcuri . |
| 5,141,040 | 8/1992 | Curcuri . |
| 5,170,828 | 12/1992 | Curcuri . |
| 5,509,456 | 4/1996 | Bonko et al. ............................... 157/1 |

*Primary Examiner*—James G. Smith
*Attorney, Agent, or Firm*—Reising, Ethington, Barnes, Kisselle, Learman & McCulloch, P.C.

[57] ABSTRACT

Apparatus for inflating a wheel-mounted tire on a high production basis comprises a platen supported on a frame beneath an inflation head on which the wheel-mounted tire is received. The platen has internal air passages opening opposite a fixed support plate of the frame through which pressurized air is directed to selectively float the platen above the support plate to facilitate near-frictionless horizontal movement of the platen in all radial directions. A centering device locates the wheel-mounted tire precisely in line with the inflation head after which the air is discontinued to lower the platen back onto the support plate. The inflation head is then operated to inflate the tire. The platen is refloated and centered in a home position by a platen centering device.

27 Claims, 7 Drawing Sheets

TIRE INFLATION APPARATUS AND METHOD HAVING FLOATING PLATEN

This application claims benefit of provisional application 60/037,554, filed Feb. 11, 1997.

This invention relates generally to automated assembly line equipment for inflating wheel-mounted tires.

BACKGROUND OF THE INVENTION

In modern automotive vehicle assembly plants, automated equipment is used to assemble and inflate tires on wheels in preparation for mounting on a vehicle. This invention concerns the construction and operation of the equipment used to inflate the wheel-mounted tires.

At a typical tire inflation station, a wheel-mounted tire is conveyed onto a stationary bed beneath an overhead tire inflation head. Centering arms then engage the tire and slide it across the bed toward alignment with the inflation head. The inflation head is then moved downwardly into engagement with the wheel-mounted tire and inflation air is delivered into the interior of the tire around its bead. The head is then retracted, allowing the bead of the tire to seat and seal against the rim of the wheel.

An inherent disadvantage with the above existing technology is that it is difficult to locate the tires precisely and repeatedly in the same position beneath the inflation head. Even small variations in the positioning of the tires can produce objectionably large variation in the resultant air pressure of the tires.

With the existing tire inflating device, the tires rest directly on the stationary bed, introducing considerable frictional resistance to the sliding of the tires across the bed. Consequently, the tires resist movement by the centering arms and lead discrepancies in the uniform positioning and inflation of the tires.

The present invention overcomes or greatly minimizes such deficiencies of the prior art.

SUMMARY OF THE INVENTION

An apparatus according to the invention for positioning and inflating wheel-mounted tires includes a frame having stationary support member with a support surface. A tire inflation device having an inflation head is arranged above the support member and is movable along a generally vertical working axis between a raised position and lowered position. A tire platen assembly is provided having a lower surface supported by the support surface and an upper surface adapted to support a wheel-mounted tire on its side beneath the inflation head such that a central axis of the tire is generally parallel to the working axis of the inflation head. The platen assembly is movable relative to the stationary support member in any select one of a plurality of directions transverse to the working axis. A tire positioning device is operative to engage and displace the wheel-mounted tire and the platen assembly on which is rests transversely of the working axis for locating the tire in a predetermined position with respect to the inflation head prior to movement of the inflation head to the lowered position.

According to a characterizing feature, the platen is acted upon by a plated hovering device to selectively cause the platen assembly to float above the support surface of the stationary support member during positioning, so as to provide friction-free or near friction-free movement of the platen assembly and thus the tire. According to a preferred construction, the hovering device includes a pressurized air floatation system that operates to supply flotation air beneath the platen exerting sufficient lifting force to float the platen assembly above the support surface. The flotation air is discontinued once the platen is positioned, causing the platen to come to rest on the stationary base and be supported thereby during inflation of the tire in precise alignment with the inflation head.

The invention also contemplates a method for positioning and inflating a wheel-mounted tire, which includes placing the wheel-mounted tire on a platen that is movable relative to a stationary base, engaging and displacing the tire and platen on the base transversely relative to a generally vertical working axis of an overhead tire inflation head so as to locate the wheel-mounted tire in a predetermined position relative to the inflation head, and then lowering the inflation head into engagement with the tire and inflating the tire with air. Flotation air is supplied beneath the platen to float the platen and tire above the base during positioning, to eliminate frictional forces between the tire and base.

A principal advantage of the invention is that it enables wheel-mounted tires to be precisely located with respect to the inflation head, assuring uniform, repeatable inflation of the tires, thereby minimizing or altogether eliminating objectionable variation in air pressure.

The invention greatly reduces or altogether eliminates the friction between the tire and the stationary base in a simple, cost-effective manner. The use of flotation air is particularly advantageous since pressurized air is already available at such stations for inflating the tires.

THE DRAWINGS

These and other objects and advantages of the invention will become more readily apparent to those skilled in the art when considered in connection with the following detailed description and drawings, wherein.

DETAILED DESCRIPTION

Figure 1:
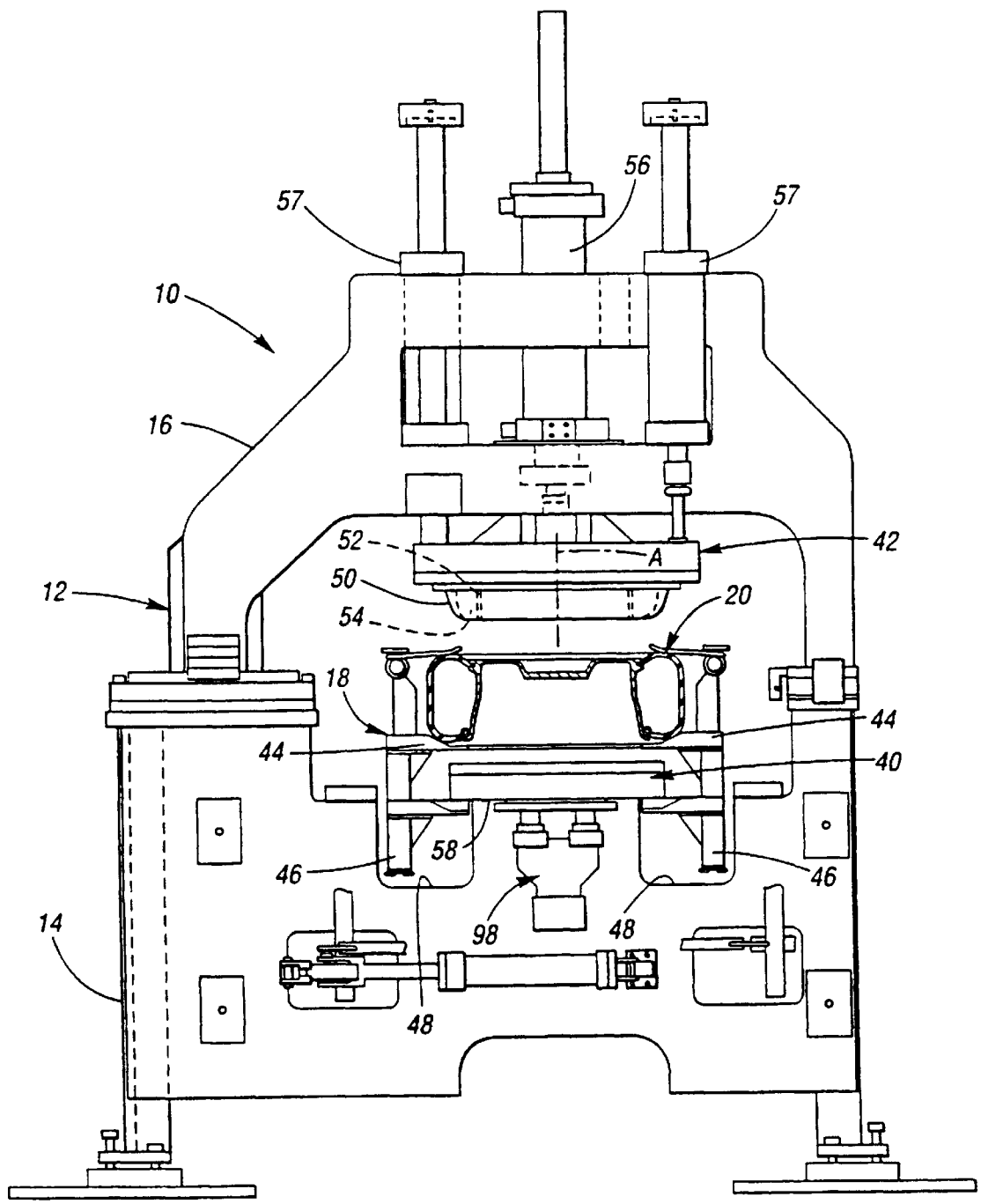
FIG. 1 is a front elevation view of an apparatus constructed in accordance with a presently preferred embodiment of the invention having the inflation head thereof shown in the raised position.

A high production tire inflation apparatus or station constructed in accordance with a presently preferred embodiment of the invention is generally shown at 10 in the drawings.

As shown in FIG. 1, the apparatus 10 includes a stationary frame 12 having a base 14 and an upper section 16 that extends vertically above the base 14 to provide clearance through which an indexing conveyor system 18 extends to convey wheel-mounted tires or wheel assemblies 20 through the station.

The wheel assemblies 20 are conveyed and supported on their side during inflation and include a tubeless tire 22 of the type having an upper and lower tire bead 24, 26, an outer peripheral tread 28, and upper and lower side, walls 30, 32. The tire 22 when received at the station 10, has been previously mounted on a wheel 34 between its opposed upper and lower wheel flanges or rims 36, 38.

A tire support platen assembly 40 is provided along the path of the conveyor 18 beneath a tire inflation head 42. The conveyor 18 operates to lift a wheel assembly 20 presented at the receiving end of the station 10 and carry it into position beneath the inflation head 42, whereupon the wheel assembly 20 is lowered and supported on the platen assembly 40. Following inflation, the conveyor 18 lifts the wheel assembly 20 off the platen assembly 40 and conveys it out of the station to ready the station for the next cycle.

In the illustrated embodiment, the conveyor 18 comprises a conventional lift-and-carry mechanism of the type having opposed, inwardly directed support arms 44 that engage the underside of the wheel assemblies 20 during conveyance. The arms 44 are mounted on reciprocating shuttles 46 that move in the longitudinal direction of the apparatus 10 along channels 48 provided in the base 14, and are supported for selective vertical displacement to permit the arms 44, and hence the wheel assemblies 20, to be raised or lowered as necessary. While a lift-and-carry conveyor mechanism is the preferred means for transporting the wheel assemblies onto and off of the platen assembly 40, it is contemplated that other conveyor systems which accomplish the same function of loading and unloading the wheel assemblies on the platen 40 may be employed and includes the various systems presently in use in the tire conveyance industry as well as others that achieve the same result.

The tire inflation head 42 may be of the conventional type which operate to seal against the wheel assembly 20 and displace the upper bead 24 from the upper flange 36 to permit injection of air from the head 42 around the bead 24 and into the tire 22. In the illustrated embodiment, the inflation head 42 includes an outer annular seal ring 50 having a central, generally vertical axis A, and an inner seal ring 52 concentric with the outer seal ring 50 and spaced therefrom to provide an annular chamber 54 between the seal rings 50, 52. The chamber 54 communicates with a source of pressurized air in know manner, such as through a suitable fitting opening in to the chamber 54.

Figure 11:
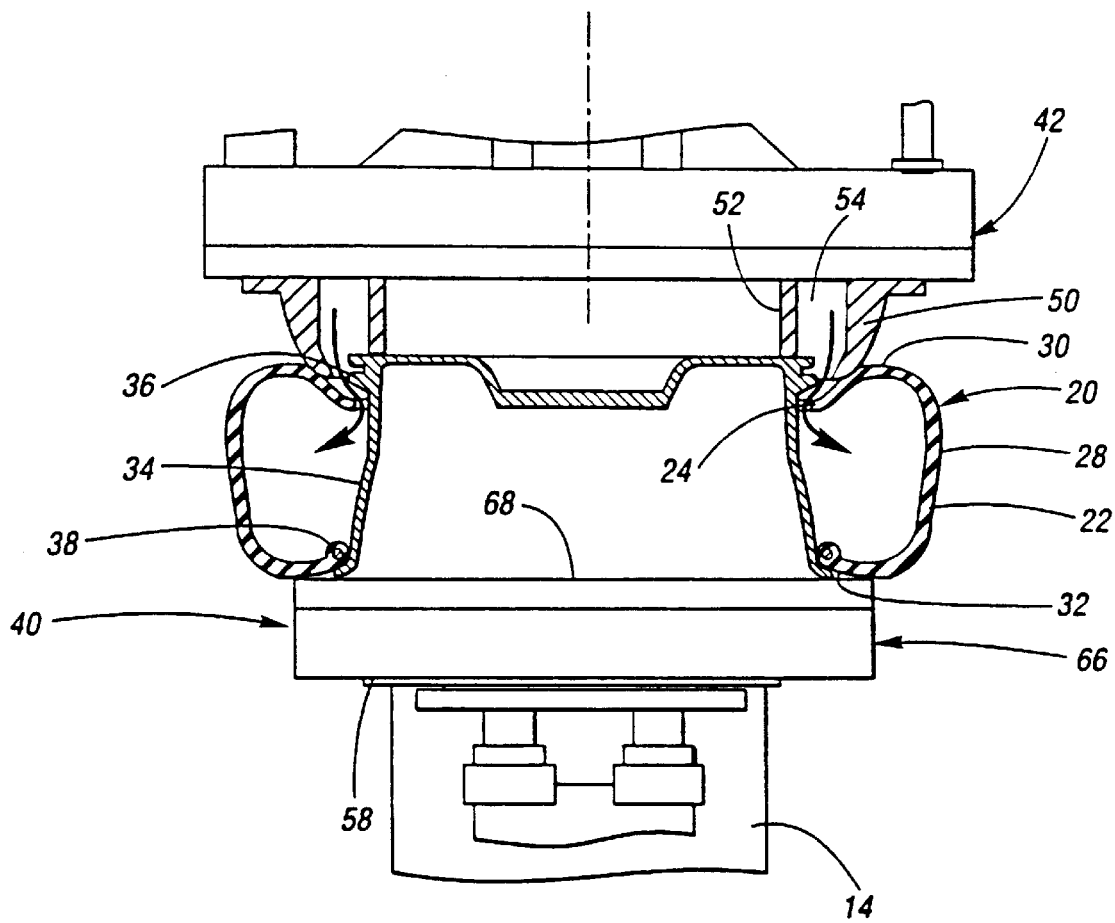
FIG. 11 is an enlarged fragmentary sectional view showing the inflation head in the operative lowered position.

The inflation head 42 is mounted on a vertical actuator 56 fixed to the upper section 16 of the frame 12. The actuator 56 may comprise a hydraulic cylinder, air cylinder, or mechanical drive and is operative to move the inflation head 42 along its working axis A between an inoperative raised position, shown in FIG. 1 and an operative lowered position, shown in FIG. 11. Linear guides 57 are also mounted on the upper section 16 of the frame 12 adjacent the actuator 56 and are coupled to the head 42 to provide additional support to the head 42 during movement along the axis A.

The base 14 includes a stationary support plate 58 having a generally planar, horizontally disposed upper surface 60 and an outer circular perimeter 62 of predetermined diameter. A central annular opening 64 of predetermined diameter is provided in the plate 58 having an axis B in coaxial alignment with the working axis A.

The platen assembly 40 has a top plate 66 having a horizontally disposed upper support surface 68 that is generally planar and air impervious. The plate 66 has an outer circular perimeter 70 of a predetermined diameter that is relatively greater than the diameter of the fixed support plate 58.

A cylindrical hub 76 is fixed to the plate 66 and extends downwardly therefrom through the central opening 64 of the stationary support plate 58 along longitudinal control axis C thereof. The hub 76 has an outer diameter which is less than the diameter of the central opening 64 to define an annular gap 78 therebetween. A bottom plate 80 is fixed to the lower end of the hub 76. The plate 80 carries a plurality of circumferentially spaced bearing pads 82 that project a uniform distance above an upper surface of the plate 80. The pads 82 are fabricated of a low friction material, such as nylon, teflon, or the like.

The support plate 58 mounts a stationary spacer plate 84 in position between the support plate 58 and the bottom plate 80. The spacer plate 84 has a central opening 86 that is preferably the same diameter as the central opening 64 of the support plate 58 and is aligned coaxially therewith to accommodate the hub 76. A lower surface 88 of the spacer plate 84 is spaced from the top of the bearing pads 82. The spacer plate 84 is preferably adjustable axially relative to the support plate 58 in order to provide an adjustable width gap 90 between the lower surface 88 of the spacer plate 84 and an upper surface 92 of the bearing pads 82 (see FIG. 3). For this purpose, the spacer plate 84 is mounted by adjustment screws 94 to the support plate 58 in order to adjust the size of the gap 90, and thus the overall effective thickness of the fixed support plate and spacer plate assembly (i.e., the distance between the upper surface 60 of the support plate and lower surface 88 of the spacer plate 84).

It will be appreciated that the provision of the gap 90 enables the platen assembly 40 to move vertically relative to the support plate and spacer plate assembly, such that the top plate 66 is able to be raised out of contact with the underlying support plate 58. The bottom plate 80 is raised with the top plate 66, causing the bearing pads 82 to confront the spacer plate 84 and close the gap, thereby limiting the upward travel of the top plate 66 by the width of the gap 90.

It will also be appreciated that the annular gap 78 that exists between the hub 76 and the walls of the openings 64, 86 enables the platen assembly 40 to move transversely of the working axis A relative to the fixed support plate 58 in all radial directions relative to the working axis A, by the distance of the gap 78, and limited in travel by confrontation between the hub 76 and the walls of the openings 64, 86. Consequently, the wheel assembly 20, when supported on the top plate 66, is movable both vertically and horizontally relative to the stationary support plate 58 and the fixed working axis A of the inflation head to accommodate precise positioning of the wheel assembly 20 with respect to the inflation head 42 by operation of a tire centering device 96 to be described in greater detail below.

One of the principal objectives of the invention is to minimize frictional forces between the wheel assembly 20 and the stationary plate 58 that interfere with precise, repeatable alignment of the wheel assemblies 20 with the inflation head, 42. The invention achieves these objectives by providing a platen hovering device 98 that selectively acts on the platen assembly 40 to elevate and maintain the top plate 66 in hovering, spaced relation above the fixed support plate 58 during positioning of the wheel assembly 20. As shown best in FIGS. 3, 4, and 8, the platen hovering device preferably comprises an air flotation system operative to introduce flotation air between the facing surfaces of the top plate 66 and the underlying support plate 58 in order to float the platen assembly 40 on a bed of air above the support plate 58. The air flotation system includes internal air passages or channels 100 provided in the platen assembly 40 that include a central bore 102 extending through the bottom plate 80 and hub 76 and coupled at its lower end by a flexible conduit 104 to a source of air under pressure 105 through valve mechanism 106. A control system 108 is provided for operating the valve mechanism 106 to control the flow of air from the source 105 to the platen assembly 40.

Figure 3:
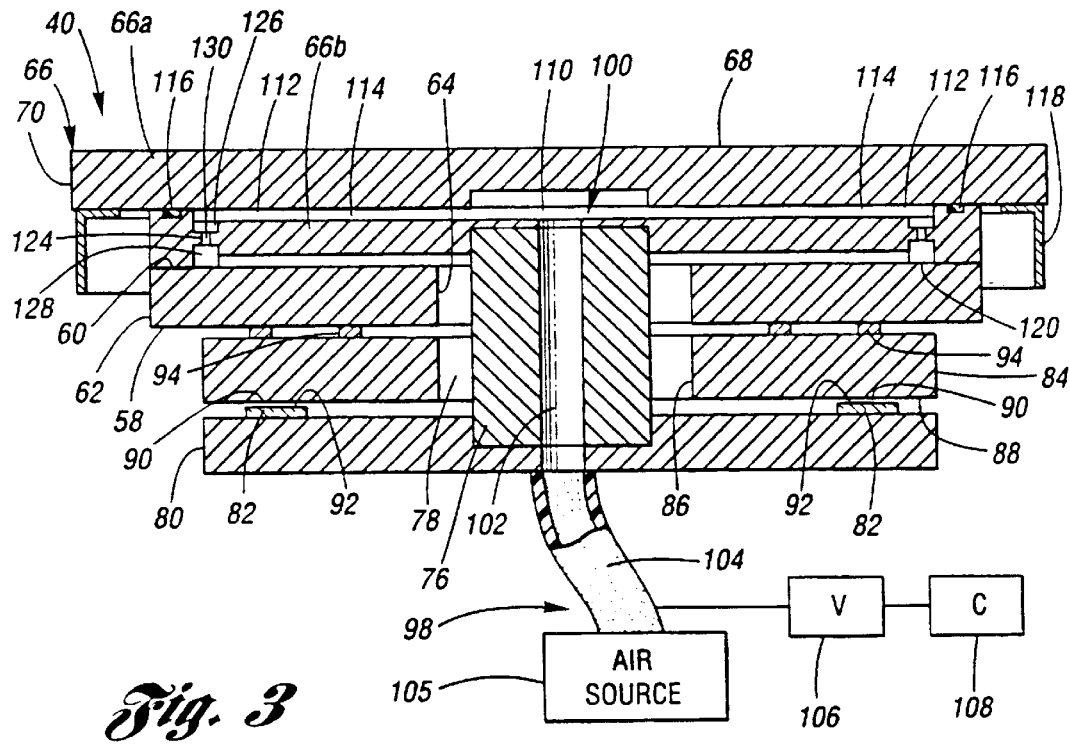
FIG. 3 is an enlarged cross-sectional view of the tire platen assembly shown in the rest position.
Figure 4:
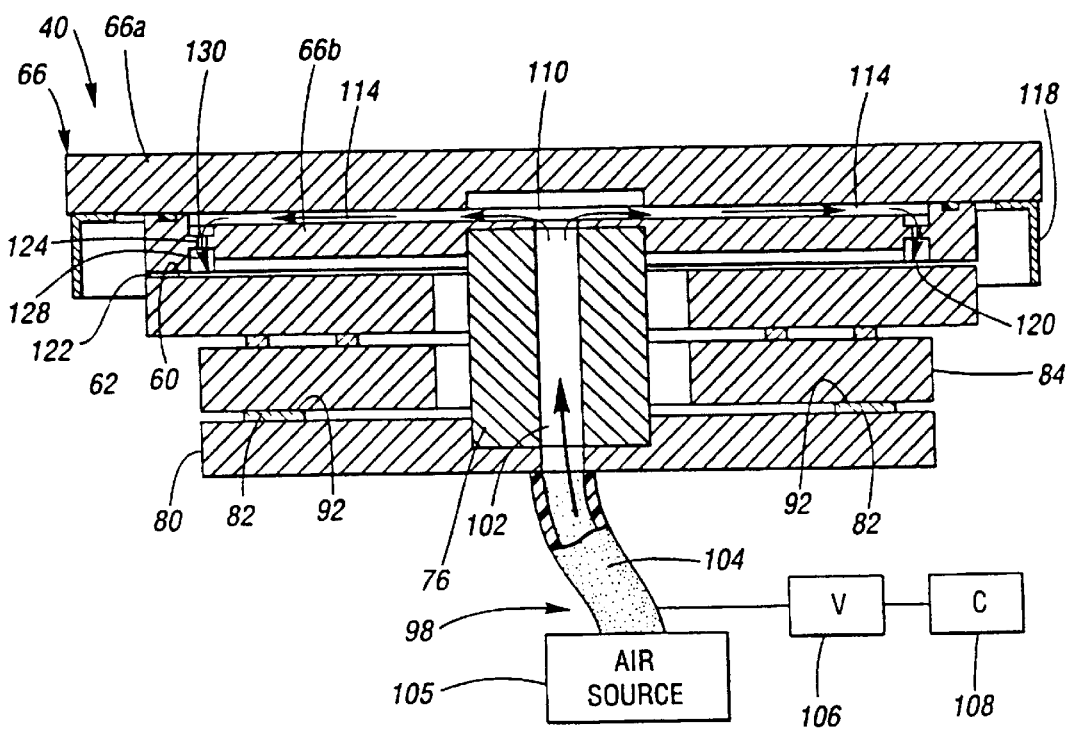
FIG. 4 is a view like FIG. 3 but showing the platen assembly in the elevated floating position.
Figure 5:
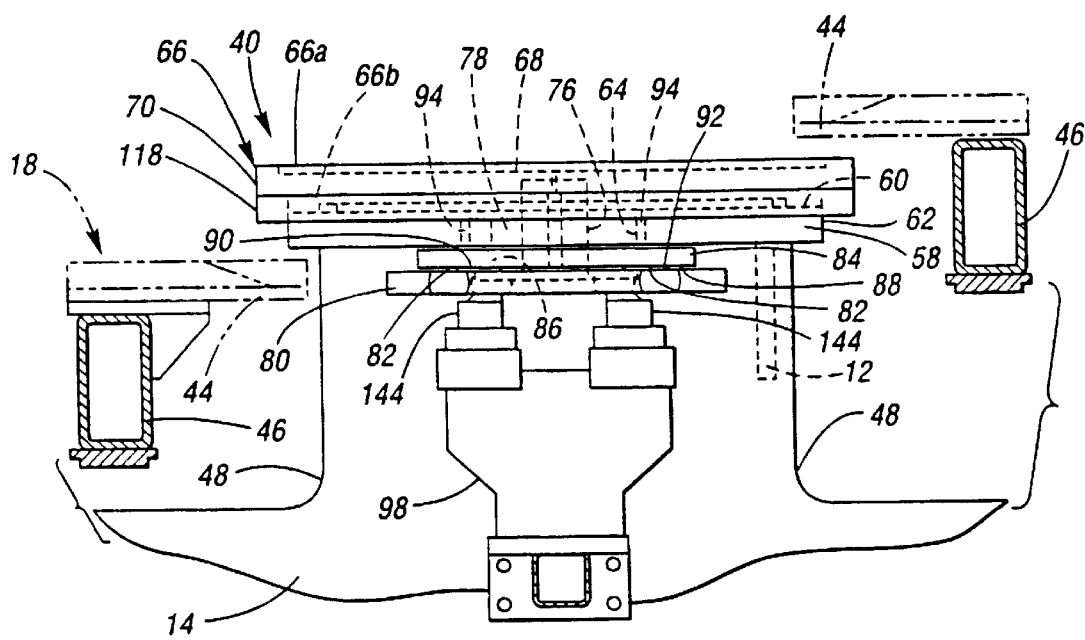
FIGS. 5 and 6 are front elevation and plan views, respectively, of the tire platen assembly and an adjacent lift and transfer conveyor.
Figure 6:
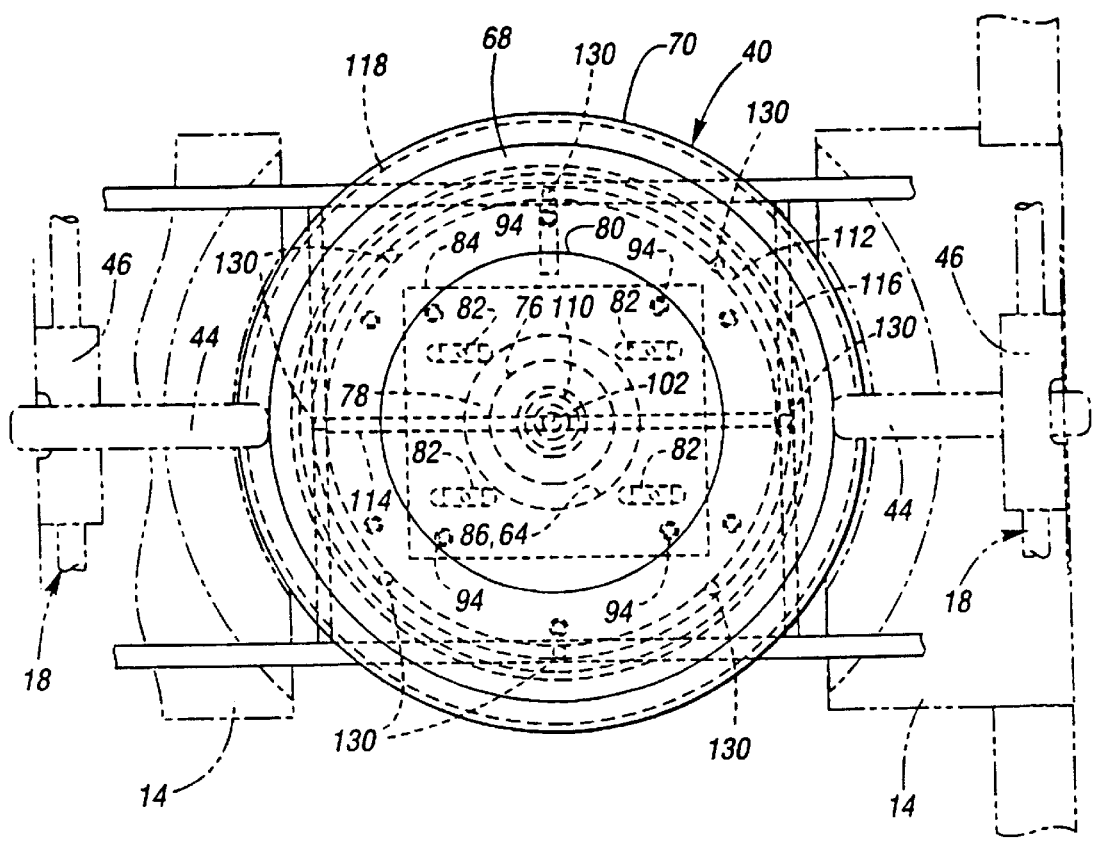
Figure 7:
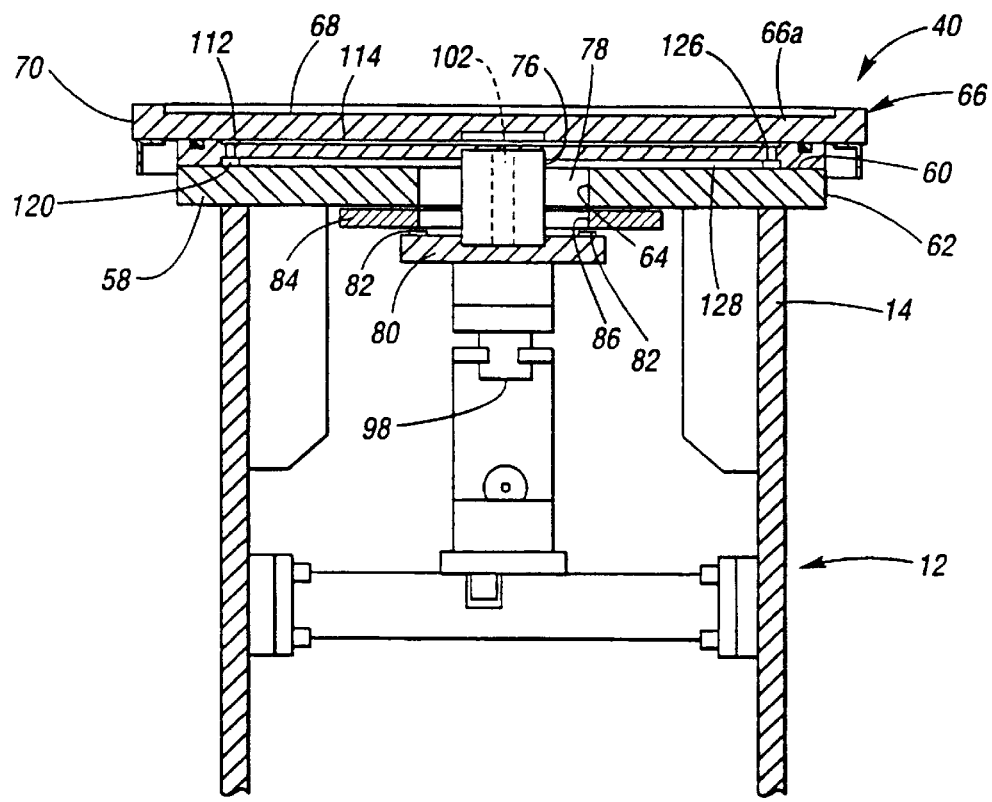
FIG. 7 is a side elevation view taken along lines 7—7 of FIG. 5.
Figure 8:
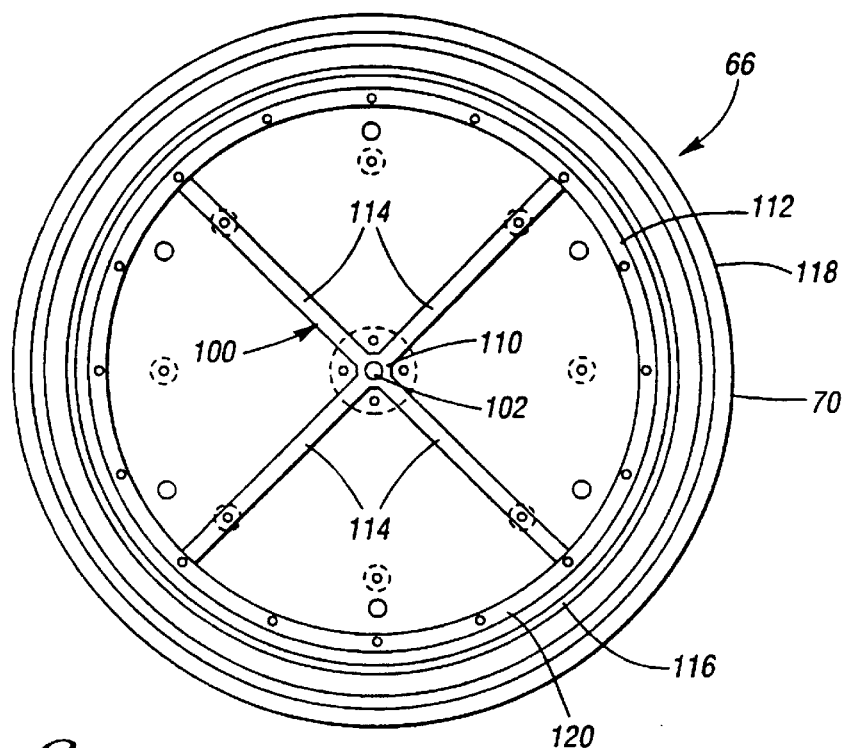
FIG. 8 is a bottom view of a component of the tire platen assembly illustrating the air flow channels formed therein.

The top of the bore 102 opens to a network of air passages formed within the top plate 66. Referring to FIGS. 3, 4 and 8, this network includes a central manifold region 110 that is directly in line with the bore 102, an outer annular chamber 112 adjacent the outer perimeter of the plate 66, and a series of circumferentially spaced radially extending passages 114 connecting the central region 110 and the outer chamber 112 to provide fluid communication therebetween. Referring to FIGS. 3, 4 and 8, it is preferred that the top plate 66 be constructed from separate upper 66a and lower 66b sections having facing surfaces that are configured such that, when joined, they define the internal air passages within the top plate 66. An annular ring seal 116 is provided between the upper and lower sections of the top plate 66 to seal the air passages therein against leakage at the interface of the plate sections 66a, 66b. It will be appreciated that the top plate 66 could be constructed as one piece, such as by casting, with the passages formed therein. The hub 76 as well could be cast unitarily with either the top plate 66 or the bottom plate 80, if desired.

Still referring to the same Figures, the annular chamber 112 opens to the bottom surface 74 of the top plate 66 perpendicularly to the upper surface 60 of the fixed support plate 58. The lower section 66b of the top plate 66 is preferably the same diameter as the support plate 58, whereas the upper section 66a is somewhat larger in diameter corresponding to the outer perimeter 70 of the top plate 66. An annular skirt or shroud 118 is mounted on the upper section 66a adjacent its perimeter 70, and extends downwardly therefrom beyond the upper surface 60 of the support plate 58. The shroud 118 is spaced radially outwardly from the edge 62 of the plate 58 by a distance preferably equal to or greater than the width of the annular gap 78.

The operation of the apparatus 10 will now be described. At the commencement of a cycle, the inflation head 42 is located in the fully raised position shown in FIG. 1 and the top plate 66 is at rest on the fixed support plate 58, as illustrated in FIG. 3, with the hub 76 centered in the openings 64, 86 to permit maximum horizontal displacement of the platen assembly 40 in all radial directions relative to the working axis A.

An uninflated wheel assembly 20 presented at the receiving end of the apparatus 10 is loaded by the conveyor 18 onto the top plate 66, and is then retracted into the channels 48 out of engagement with wheel assembly 20.

Once the wheel assembly 20 is loaded, pressurized flotation air is delivered from air source 105 into the passages of the platen assembly 40 by operation of the controller 108 and valve 106. Air entering the central bore 102 is directed, as illustrated in FIG. 4, into the central region 110 and from there along the radial passages 114 into the outer annular chamber 112 where it escapes through annular bottom opening 120. The escaping air flow confronts the upper surface 60 of the fixed support plate 58 and exerts an upward lifting force on the top plate 66, raising it above the underlying support plate. 50 and defining a gap 122 therebetween (FIG. 4). The low friction bearing pads 82 move upwardly with the top plate 66 and confront the lower surface 92 of the spacer plate 84 to thereby limit the upward travel of the platen assembly 40. The flotation air exiting the bottom opening 120 of the chamber 112 flows through the gap 122 in an outward direction, creating a bed of flotation air which acts to support and maintain the platen assembly 40 in the hovering elevated state above the support plate 58. The air that escapes radially outwardly from the gap 122 confronts the shroud 118 and is redirected downwardly. As shown in FIGS. 3, 4 and 8, the chamber 112 has an intermediate partition wall 124 that divides the chamber 112 into an upper 126 and lower 128 section, which communicate with one another via a plurality of circumferentially spaced apertures 130 provided in the partition wall 124.

It is preferred that the platen assembly 40 be constructed from a strong, lightweight material such as aluminum to minimize the weight of the assembly 40 and to reduce the air pressure needed to float the tire platen 40 and wheel assembly 20 above the support plate 58. It is preferred also that the air flow to the platen assembly 40 be adjustable in order to accommodate wheel assemblies of various weights. Through operation of the controller 108 and valve 106, the flow of flotation air is controlled in such manner as to provide enough lifting force to raise the platen 40 and wheel assembly 20 off the support plate 58, while minimizing the contact force between the bearing pads 82 and the spacer plate 84.

Supporting the platen assembly 40 and wheel assembly 20 in this manner eliminates all friction force between the top plate 66 and the support plate 58, as they are no longer in contact with one another. The only source of friction comes from the contact between the bearing pads 82 and the spacer plate 84, and this too can be minimized to near zero through control of the air flow, so as to minimize, and preferably eliminate all appreciable friction forces opposing horizontal movement of the tire platen 40 and wheel assembly 20 relative to the fixed support 58, frame 12, and inflation head 42.

Figure 2:
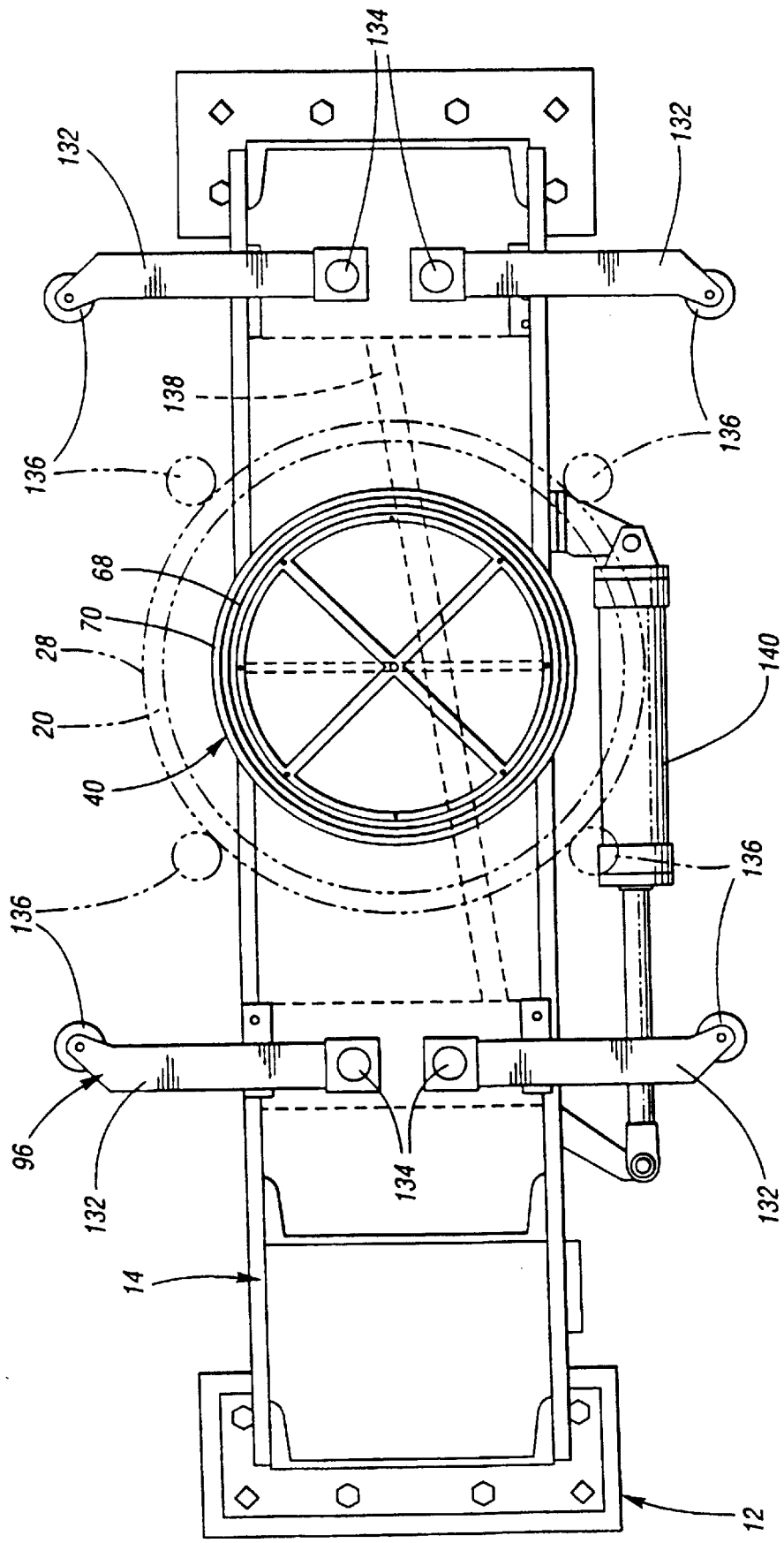
FIG. 2 is a plan view of the tire centering mechanism.

Once the tire platen 40 and wheel assembly 20 are floating, the tire centering device 96 is activated to align the wheel assembly coaxially with the working axis A. Referring to FIG. 2, the tire centering device 96 comprises a plurality, and preferably four, centering arms 132 arranged in pairs on opposite sides of the platen assembly 40. The arms 132 are pivoted at one end to the base 14 about pivot axes 134 that are equidistantly spaced from the working axis A. The arms 132 each carry a wheel-engaging member in the preferred form of a roller 136 at their opposite free ends.

The arms 132 are interconnected by a linkage assembly 138 to provide conjoint movement of the arms 132 in such manner as to maintain the rollers 136 in circumferentially spaced relation to one another and equidistant spacing from the working axis A of the inflation head 42 at all time during their movement. An actuator 140, which may be in the form of a hydraulic or air cylinder or the like, is supported by the frame 12 and coupled to the linkage assembly 138 for moving the arms 132 between an inoperative position, shown in broken lines in FIG. 2, and an operative inwardly displaced position, shown in solid lines in FIG. 2.

In operation, the actuator 140 is operated to move the rollers 136 inwardly. At some point along their travel, one or more of the rollers 136 engage the outer perimeter 28 of the tire 22 and upon further inward movement, relocate the wheel assembly 20 by displacing it horizontally in whatever radial direction necessary to bring the tire into full contact with all four rollers 136. Since the rollers 136 are spaced equidistantly from the working axis A, it is assured that the axis of the wheel assembly 20 is aligned precisely with the working axis A of the inflation head 42.

It will be appreciated that the frictionless or near-frictionless support provided to the wheel assembly 20 by the floating platen 40 enables free, near effortless movement of the wheel assembly 20 by the centering device 96 in whatever transverse direction is necessary to bring the wheel assembly 20 into precise, coaxial alignment with the working axis A.

Once the wheel assembly 20 is precisely aligned with the working axis A, the flotation air is discontinued, causing the top plate 66 to come to rest on the upper surface 60 of the support plate 58.

With the wheel assembly 20 precisely centered, the inflation head 42 is lowered into engagement with the wheel assembly 20 and the tire inflated in the usual manner to the desired air pressure. The head 42 is then returned upwardly and the conveyer 18 operated to lift the wheel assembly 20 off the tire platen 40 and transport it out of the apparatus 10 on toward the next station. The conveyor 18 then returns to the receiving end of the station in preparation to receive the next wheel assembly.

At some point between the lowering of the positioned tire platen assembly 40 onto the support plate 58 and the engagement of the wheel assembly 20 by the inflation head 42, the centering arms 132 are moved out of engagement with the tire 22 and returned outwardly to their inoperative positions.

Figure 9:
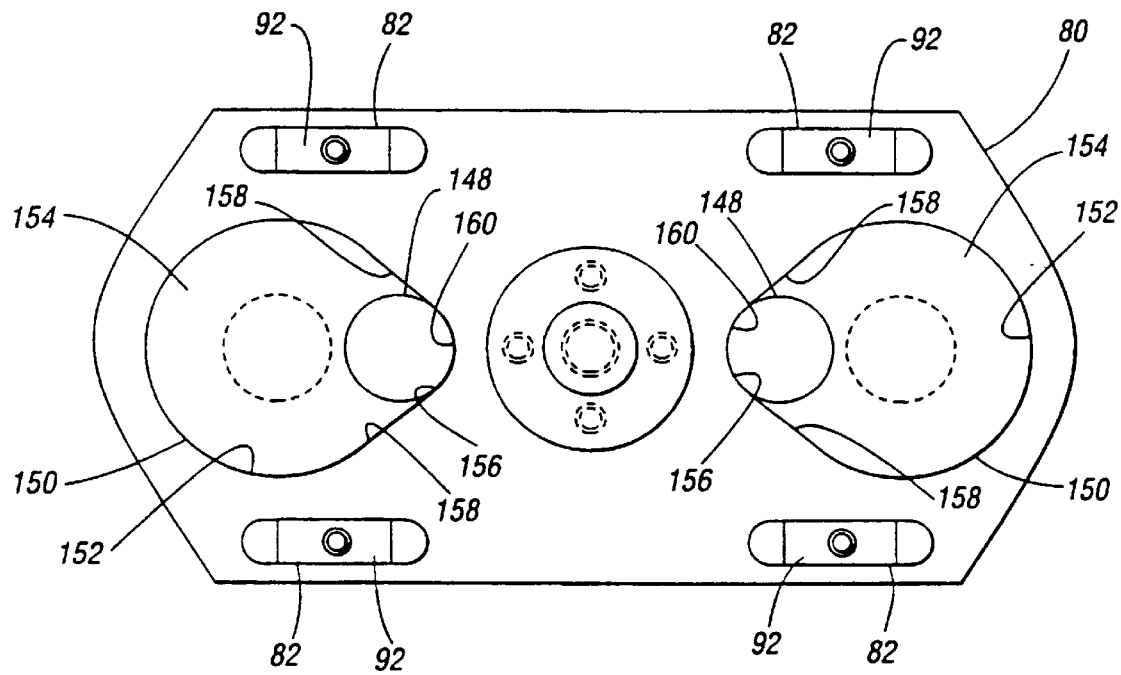
FIG. 9 is a plan view of a lower repositioning plate component of the floating platen assembly.
Figure 10:
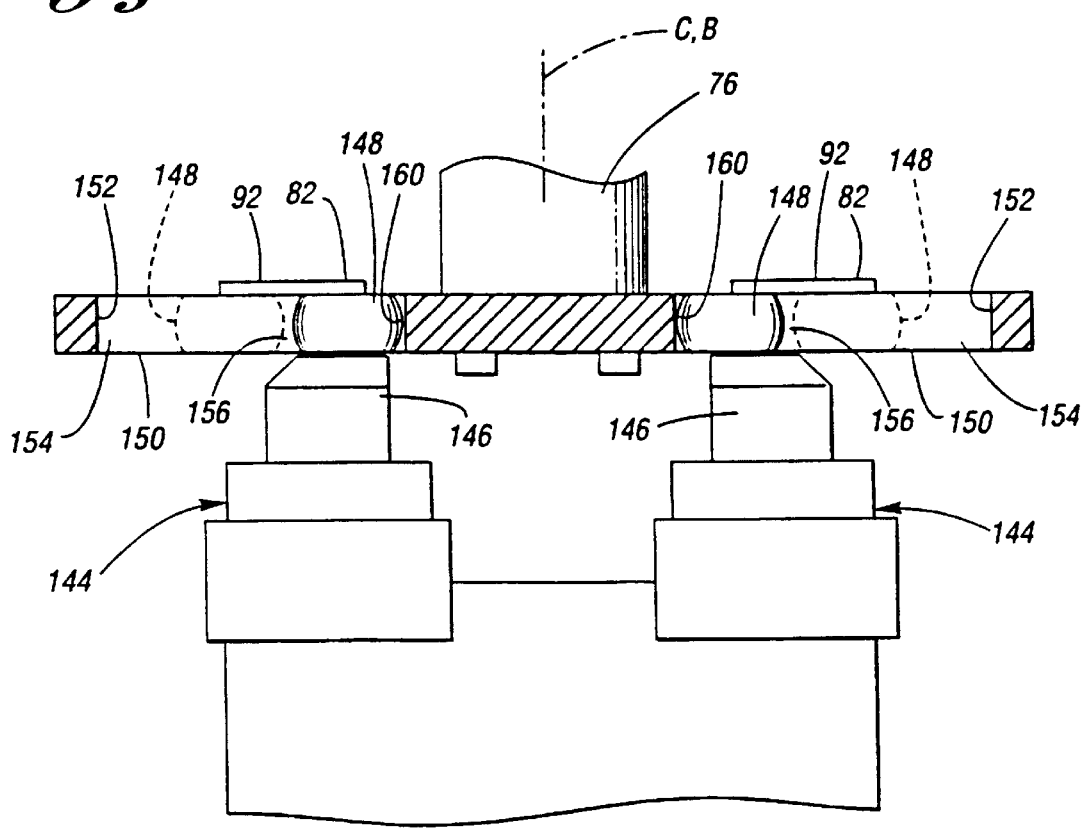
FIG. 10 is a cross-sectional view taken along lines 10—10 of FIG. 9.

Before loading the next wheel assembly onto the tire platen 40, the platen assembly 40 is repositioned centrally within the openings 64, 86 to restore the full range of horizontal adjustment to the tire platen 40. For this purpose, the apparatus 10 is provided with a platen repositioning device 144 operative to relocate the platen assembly 40 in a predetermined home position with respect to the fixed support plate 58 at the commencement of each cycle. As shown best in FIGS. 5, 7, 9 and 10, the platen repositioning device 144 preferably comprises a pair of motor driven centering arms 146 supported by the base 14 beneath the tire platen assembly 40. The arms 146 carry a pair of cam followers 148 supported equidistantly from the central axis B of the plate openings 64, 86 in opposed relation to one another. The cam followers 148 are accommodated within tear drop shaped openings 150 provided in the bottom plate 80 in diametrically opposed relation to the central axis C of the hub 76. The openings 150 each have an enlarged circular region 152 spaced equidistantly from the axis C and having a diameter greater than that of the cam followers 148 to define an annular gap 154 between the wall of each circular portion 152 and its associated cam follower 148 that is equal to or slightly greater than the annular gap 78 when the cam followers 148 are centered in the circular portion 152 (solid line position in FIGS. 9 and 10).

The openings 150 are formed with a tapering section 156 defined by camming surfaces 158 that extend from the circular regions 152 inwardly toward the hub and converge at an arcuate seat 160 whose surfaces lie along a circle having the same diameter as that of the cam followers 148 and spaced equidistantly from the axis C of the hub 76.

In operation, after the inflated wheel assembly 20 has been off-loaded from the tire platen 40, the controller 108 is operated to float the tire platen 40 above the support plate 58. The platen 40 is then recentered to the home position with respect to the support plate by advancing the positioning arms 146 and their cam followers 148 inwardly toward the central axis B of the plate openings 64, 86 in such manner that the cam followers 148 are maintained in equal distance relation to the axis B. Any misalignment between the tire platen 40 and support plate 58 is corrected by the interaction of the cam followers 148 and the walls of the tapering section 156 which confront to reorient the plate into position where the cam followers 148 are fully received in the arcuate seats 160 of the plate 80, shown in solid lines in FIGS. 9 and 10. When so positioned, the axis of the hub C is aligned with the axis B of the support plate 58, centering the hub 76 in the openings 64, 86.

The flotation air may then be discontinued to lower the tire platen 40 back onto the support plate 58, and the cam followers 148 returned to their inoperative positions centered within the enlarged circular portions to maximize the allowable horizontal movement of the tire platen 40 and ready it to receive the next wheel assembly 20. The centering device 144 that interacts with the tear drop openings 150 of the bottom plate 80 is preferably a robotic device manufactured by Robohand, Model No. RP-43P-C-PWP. While this unit is preferred, it will be appreciated that other centering devices which act on the tire plate 40 so as to realign the axis C of the tire platen 40 with the axis B of the support plate 58 could be used and is contemplated within the scope of the invention. Such a device could include, for example, similar positioning arms and cam followers as those described driven by an electric motor, fluid cylinder, mechanical linkage, etc. that would operate to advance the cam followers conjointly toward the axis B while maintaining their equidistance spacing from the axis B.

It is to be further understood that other routings could be used to introduce the flotation air into the tire platen 40 then that shown in the illustrated embodiment, provided they enable the platen assembly 40 to float above the support plate 58. Further, means other than flotation air may be employed, such as the flow of other gases or fluids or counteracting magnetic forces introduced between the support plate 58 and the top plate 66.

The disclosed embodiment is representative of a presently preferred form of the invention, but is intended to be illustrative rather than definitive thereof. The invention is defined in the claims.

We claim:

1. Apparatus for inflating a wheel-mounted tire comprising:

a frame;

a stationary support member mounted on said frame having a support surface;

a tire inflation device having an inflation head arranged above said support member and movable along a generally vertical working axis thereof toward and away from said support member between an operative lowered position and an inoperative raised position, respectively;

a tire platen assembly having a lower surface supported by said support surface and an upper surface adapted to support a wheel-mounted tire on its side beneath said inflation head such that a central axis of the wheel-mounted tire is arranged generally parallel to said working axis of said inflation head, said platen assembly being movable relative to said support member in any selected one of a plurality of directions transverse to said working axis;

a platen hovering device acting on said platen assembly to selectively elevate and maintain said lower surface of said platen assembly and the wheel-mounted tire supported thereon in hovering spaced relation above said support surface of said support member; and a tire centering device having wheel-engaging members supported for coordinated movement into engagement with the hovering wheel-mounted tire in such manner as for displacing the wheel-mounted tire and said platen assembly transversely of said support member to align the central axis of the wheel-mounted tire precisely with said working axis of said inflation head.

2. The apparatus of claim 1 wherein said platen hovering device comprises an air flotation system operative to introduce flotation air between said surfaces of said platen and said support member in order to float said platen on a bed of air above said support member permitting substantially frictionless horizontal movement of said platen assembly relative to said support member and said working axis.

3. The apparatus of claim 2 wherein said air flotation system comprises a series of internal air passages provided in said platen assembly, said passages opening downwardly opposite said support surface of said support member to direct pressurized flotation air introduced into said passages against said support member.

4. The apparatus of claim 3 wherein said platen assembly includes a top plate overlying said support member and formed with said lower surface and said passages.

5. The apparatus of claim 4 wherein said top plate includes an upper section and a lower section joined together along mating surfaces, said mating surfaces being configured to define said passages of said top plate.

6. The apparatus of claim 4 wherein said support member includes a central opening of predetermined diameter and said platen assembly includes a central hub projecting downwardly from said top plate and accommodated in said central opening of said support member.

7. The apparatus of claim 6 wherein said hub is formed with an outer diameter relatively smaller than that of said central opening defining an annular gap therebetween.

8. The apparatus of claim 7 wherein said annular gap defines a range of said relative horizontal movement of said platen assembly relative to said support member.

9. The apparatus of claim 6 wherein said platen assembly includes a bottom plate fixed to a lower end of said hub.

10. The apparatus of claim 9 including an intermediate plate disposed between said support member and said bottom plate of said platen assembly in spaced relation to said bottom plate to provide a horizontal gap of predetermined width therebetween when said top plate is resting on said support member.

11. The apparatus of claim 10 wherein said intermediate plate is adjustable horizontally relative to said support member to vary the width of said horizontal gap and thus the upward travel of said platen assembly above said support member.

12. The apparatus of claim 10 including low friction bearing surfaces provided between said bottom plate and said intermediate plate to minimize frictional contact force between said bottom plate and said intermediate plate when said platen assembly is supported in hovering relation above said support member.

13. The apparatus of claim 3 wherein said tire centering device comprises a plurality of centering arms supporting a plurality of said tire engaging portions in concentric equidistant spaced relation to said working axis of said inflation head, said arms being interconnected in such manner as to advance said tire-engaging portions simultaneously inwardly toward one another while maintaining said concentric equidistant spaced relationship with said working axis so as to engage and center the outer perimeter of the wheel-mounted tire in precise alignment with said working axis of said inflation head.

14. The apparatus of claim 3 including a control device operative for controlled delivery of flotation air into said passages to raise and lower said platen assembly relative to said support member in timed relation to the operation of said tire inflation device and said tire centering device.

15. The apparatus of claim 2 including a platen centering device acting selectively on said platen assembly to locate said platen assembly in a predetermined home position relative to said support member.

16. The apparatus of claim 15 wherein said platen centering device includes a plurality of positioning arms having platen-engaging portions.

17. The apparatus of claim 16 wherein said platen centering device includes camming surfaces provided on said platen assembly in position to interact with said platen-engaging portions in such manner as to automatically relocate said platen assembly in said home position.

18. The apparatus of claim 16 wherein said platen centering device includes a pair of said positioning arms and a corresponding pair of openings formed in said platen assembly in which said platen-engaging portions are received.

19. The apparatus of claim 18 wherein said openings each have a generally tear drop shape with an enlarged generally circular central region and a narrowing tapered region, said platen-engaging portions being movable between said central regions and said tapered regions of said openings to center said platen assembly when said platen-engaging portions are moved into said tapered regions and to accommodate said transverse movement of said platen assembly relative to said support member during alignment of the wheel-mounted tire when said platen-engaging portions are positioned in said central portion of said openings.

20. A method of inflating a wheel-mounted tire at a tire inflation station comprising the steps of:

loading the wheel-mounted tire on its side onto a tire platen assembly of the station supported in a home position beneath an inflation head of the station that is movable along a generally vertical working axis between an inoperative raised position and an operative lowered position, and with the inflation head being initially located in the raised position;

introducing a bed of flotation air beneath the platen assembly causing it to hover above an underlying stationary support member of the station;

moving the wheel-mounted tire and the platen assembly as a unit transversely of the working axis to align a central axis of the wheel-mounted tire with the working axis of the inflation head;

discontinuing the flotation air causing the platen assembly to come to rest on the underlying support member; and lowering the inflation head into engagement with the, wheel-mounted tire and inflating the tire with air delivered from said inflation head.

21. The method of claim 20 wherein the step of discontinuing the floating air is carried out prior to the step of lowering the inflation head and, wherein, following the inflation of the wheel-mounted tire, the method further comprises the steps of raising the inflation head and off-loading the wheel-mounted tire from the platen assembly.

22. The method of claim 21, further comprising the step of repositioning the platen assembly to the home position following the off-loading of the wheel-mounted tire from the platen assembly.

23. The method of claim 22 wherein the step of repositioning of the platen assembly further comprises reintroducing the bed of flotation air beneath the platen assembly to float the platen assembly above the underlying support member.

24. The method of claim 23 wherein the platen assembly is repositioned by moving a plurality of positioning arms into engagement with the platen assembly.

25. The method of claim 20 wherein the wheel-mounted tire is aligned by moving a plurality of centering arms into engagement with the wheel-mounted tire in such manner as to displace the wheel-mounted tire and the platen assembly relative to the underlying support member.

26. The method of claim 25 including providing tire-engaging portions on the centering arms that move inwardly with the movement of the centering arms and engage the outer perimeter of the tire.

27. Apparatus for inflating a tire of a tire and wheel assembly, said apparatus comprising:

a frame having a fixed support plate that includes a horizontal upper support surface and a central opening extending therethrough;

an inflation head supported by said frame above said support plate for movement along a vertical working axis between an inoperative raised position and an operative lowered position;

a tire platen having a top plate supported on said support plate, a bottom plate arranged below said support plate, and a hub extending through said central opening of said support plate and rigidly interconnecting said top and bottom plates, said top plate having a lower surface supportable on said support surface of said support plate, said top plate having an upper surface adapted to receive and support a wheel-mounted tire on its side beneath said inflation head, said platen being movable radially in all directions relative to said working axis to accommodate adjustment in the position of the axis of the tire and wheel assembly relative to said working axis of said inflation head; and a tire centering device supported adjacent said platen having tire-engaging portions engageable with said tire and wheel assembly in such manner as to move the tire and wheel assembly and said platen together as a unit relative to said frame in whatever direction necessary as needed to automatically align the axis of the tire and wheel assembly with said working axis of said inflation head.

* * * * *